(12) United States Patent
Sennett et al.

(10) Patent No.: US 8,676,153 B2
(45) Date of Patent: *Mar. 18, 2014

(54) METHOD FOR GEO-TARGETING WIRELESS EMERGENCY ALERTS

(71) Applicant: AT&T Mobility II LLC, Atlanta, GA (US)

(72) Inventors: DeWayne Allan Sennett, Redmond, WA (US); Brian Kevin Daly, Peachtree Corners, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,694

(22) Filed: Jun. 10, 2013

(65) Prior Publication Data

US 2013/0267192 A1      Oct. 10, 2013

Related U.S. Application Data

(63) Continuation of application No. 12/124,028, filed on May 20, 2008, now Pat. No. 8,478,225.

(51) Int. Cl.
*H04M 11/04*   (2006.01)

(52) U.S. Cl.
USPC ............... 455/404.1; 455/404.2; 455/412.2; 455/456.1; 455/456.3; 455/457

(58) Field of Classification Search
USPC ............ 455/404.1–404.2, 412.1–414.3, 455/456.1–456.3
See application file for complete search history.

(56) References Cited

U.S. PATENT DOCUMENTS

| | | | |
|---|---|---|---|
| 6,112,075 A | 8/2000 | Weiser | |
| 6,745,021 B1 | 6/2004 | Stevens | |
| 7,330,693 B1 * | 2/2008 | Goss | 455/3.01 |
| 8,478,225 B2 | 7/2013 | Sennett et al. | |
| 2001/0005681 A1 * | 6/2001 | Kim | 455/458 |
| 2002/0004705 A1 | 1/2002 | Baron et al. | |
| 2002/0016677 A1 | 2/2002 | Baron et al. | |
| 2003/0129977 A1 * | 7/2003 | Dolwin | 455/422 |
| 2004/0203562 A1 * | 10/2004 | Kolsrud | 455/404.1 |
| 2005/0037728 A1 * | 2/2005 | Binzel et al. | 455/404.1 |
| 2005/0261012 A1 | 11/2005 | Weiser | |
| 2006/0040639 A1 | 2/2006 | Karl et al. | |
| 2007/0049260 A1 | 3/2007 | Yuhara et al. | |
| 2007/0123220 A1 | 5/2007 | Weiser et al. | |

(Continued)

FOREIGN PATENT DOCUMENTS

EP      1209886 A2     5/2002
EP      2124493        11/2009

*Primary Examiner* — Dai A Phuong
(74) *Attorney, Agent, or Firm* — Baker & Hostetler LLP

(57) ABSTRACT

Geo-targeting may be used in combination with wireless alert capabilities to provide alerts to a more granulated geographical area. Disclosed herein is a system and method for performing geo-targeting for various alert areas such that emergency messages may be delivered to mobile and static devices of different types in a localized area. In an example embodiment, geo-targeting supports the delivery area for wireless emergency alerts by identifying the cell sites that are in a specified geographic area that have technology capable of delivering wireless emergency alerts. The components of the telecommunications system that support a wireless emergency alert system may be identified and mapped to any geographical area. The method and system of geo-target mapping may provide an efficient and more robust way of determining the telecommunication components to be employed for broadcasting emergency alerts.

20 Claims, 6 Drawing Sheets

(56) References Cited

U.S. PATENT DOCUMENTS

| | | |
|---|---|---|
| 2007/0139182 A1 | 6/2007 | O'Connor et al. |
| 2008/0009262 A1 | 1/2008 | Rudolf et al. |
| 2008/0216113 A1 | 9/2008 | Yun et al. |
| 2009/0058665 A1 | 3/2009 | Lamb |
| 2009/0227224 A1 | 9/2009 | Aftelak et al. |
| 2009/0248828 A1 | 10/2009 | Gould et al. |
| 2010/0173602 A1* | 7/2010 | Muramatsu ................ 455/404.1 |

* cited by examiner

METHOD FOR GEO-TARGETING WIRELESS EMERGENCY ALERTS

CROSS REFERENCE TO RELATED APPLICATIONS

The instant application is a continuation of, and claims priority to, U.S. patent application Ser. No. 12/124,028 filed May 20, 2008. U.S. patent application Ser. No. 12/124,028 is incorporated herein by reference in its entirety.

TECHNICAL FIELD

The technical field generally relates to communications systems and more specifically relates to geo-targeting wireless emergency alerts.

BACKGROUND

Mobile device users may receive emergency alerts that are transmitted by their wireless network provider to their mobile device. The emergency alerts may be broadcast via a broadcast network. However it is difficult to send a unique message to a particular area. For example, not all of the mobile device users that receive the emergency alert are in the geographic area affected by the emergency event. Further, not all components in the telecommunications infrastructure in a particular geographic region, such as some cell towers, are capable of broadcasting emergency alerts.

The management of telecommunications capabilities is crucial during disasters that degrade the infrastructure, especially where the infrastructure may have been minimal beforehand. It is desirable to efficiently provide emergency alerts & warnings to the greatest number of people necessary without significantly adding load to the critical network resources, and to target the alerts & warnings to people in the geographical area that is affected.

SUMMARY

Geo-targeting is a common tool for targeting information to a specified geographical area. Geo-targeting may be used in combination with wireless alert capabilities to provide alerts to a more granulated geographical area. Described herein is a system and method for performing geo-targeting for various alert areas such that emergency messages may be delivered to mobile and static devices of different types in a localized area. In an example embodiment, geo-targeting supports the delivery area for wireless emergency alerts by identifying the cell sites that are in a specified geographic area that have technology capable of delivering wireless emergency alerts. Further, the components of the telecommunications system that support a wireless emergency alert system may be identified and mapped across different geographical levels (e.g., county, state, region). In this way, mobile device users in the affected geographical area may receive the emergency alerts targeted to that geographical area.

DETAILED DESCRIPTION OF ILLUSTRATIVE EMBODIMENTS

Figure 1:
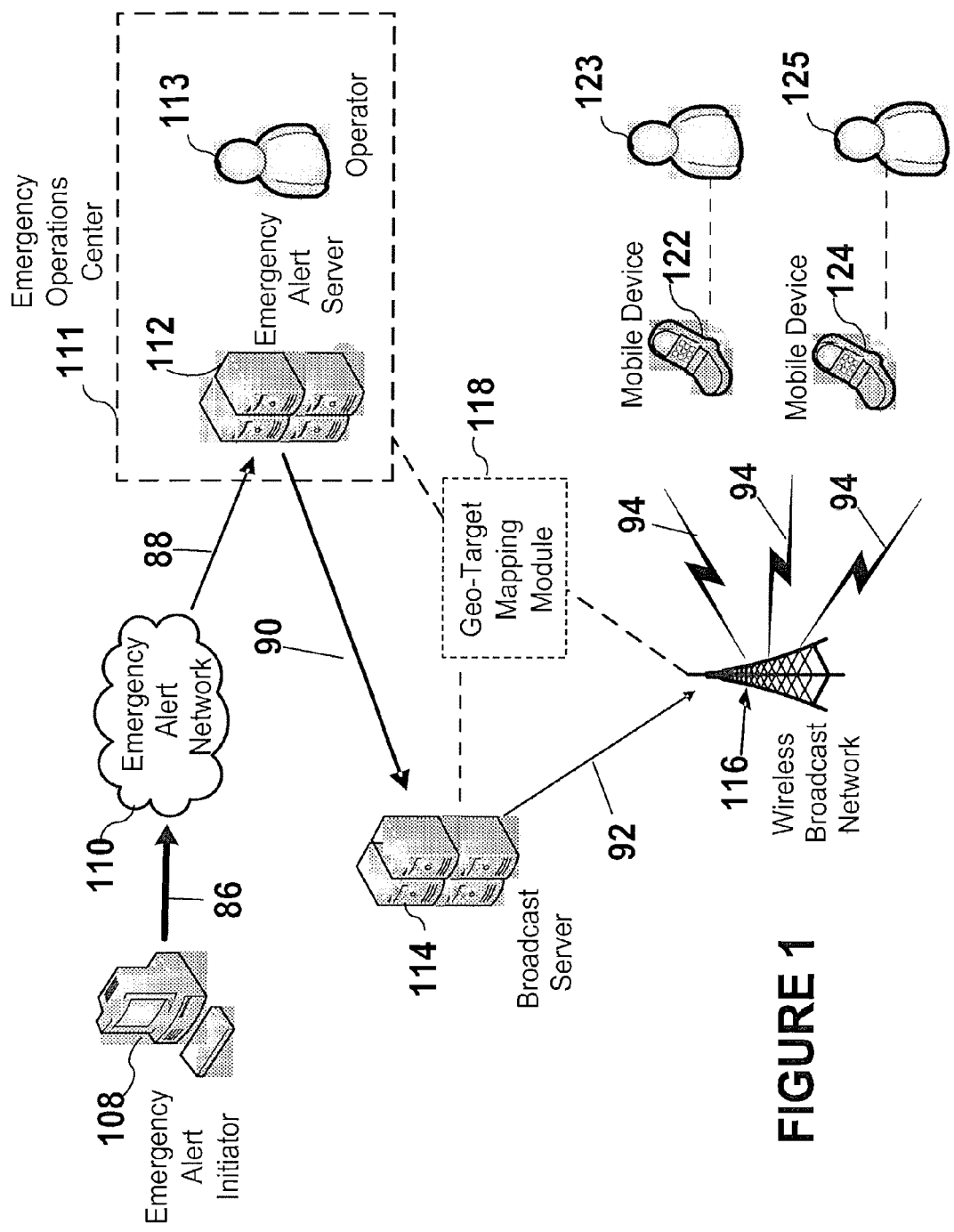
FIG. 1 depicts a method and system for geo-targeting emergency alerts to a geographic area.

A wireless network may augment a telecommunications system by broadcasting emergency messages from the telecommunications system to mobile stations associated with the wireless network. Disclosed herein is a method and system of incorporating geo-targeting into a telecommunications system such that mobile device users that are in an affected geographical area may receive notification of an emergency event. A geo-targeting mapping module may verify whether or not the telecommunications system that services a particular geographic area is capable of broadcasting emergency alerts. For example, the module may identify the Cell Site IDs in the geographic area that have broadcast technology, and what type of broadcast technology is supported in that geographic area.

The geo-target mapping module can provide broadcast capability information for a geographic area of any magnitude, small or large. Delivering alerts via the geo-targeting technique provides the capability of identifying a more granulated alerting area based on the emergency event. For example, if a shooting occurs on a college campus, students within the geographical limits of a college campus may receive the alerts on their mobile device via geo-targeting.

In the discussion that follows, details relating to mobile devices and networks are assumed to be well known. Accordingly, such details are largely omitted herein for the sake of clarity and explanation. In addition, any references herein to an example embodiment involving a cellular telephone is solely for purposes of explanation, and is not intended to limit the invention to any such embodiment. For example, a mobile device as contemplated by various embodiments of the invention may include, but are not limited to: cellular telephones, personal digital assistants (PDAs), email devices and the like. The mobile device may operate in a cellular, SMR, PCS, cordless, unlicensed AWS, 700 MHz, or other spectrums. Furthermore, embodiments are not limited by the network servicing the device. Accordingly, embodiments may be applicable to any network type including, for example, TDMA, CDMA, WCDMA, GSM, WiFi, WiMAX, OFDM, UMTS, EV-DO, HSDPA/HSUPA and other standards now known or to be developed in the future.

An example system for distributing emergency alerts in the United States is an Emergency Alert System (EAS) that was implemented by the Federal Communication Commission (FCC), National Weather Service (NWS), and Federal Emergency Management Administration (FEMA). The United States EAS is designed to provide messages from multiple origination points (e.g., county, state, federal). For example, the president can use the EAS to send a nationwide emergency alert message. The FCC provides information to broadcasters, cable system operators, and state and local emergency managers. The EAS typically provides messages indicative of a variety of types of alerts including, for example, weather conditions, disasters, America's Missing: Broadcast Emergency Response (AMBER) alerts, and/or alerts issued by the Government, for example. EAS messages may be provided to, for example, a mobile device of a user such that the EAS alert message may be broadcast to the user via the mobile device. Any references herein to an example embodiment involving the EAS is solely for purposes of explanation, and is not intended to limit the invention to any such embodiment. Any type of emergency alert system may use the disclosed techniques.

FIG. 1 depicts an example EAS system that broadcasts emergency alerts and incorporates a geo-target mapping module 118. In this example, the wireless broadcast network 116 is a cellular network and the mobile devices 124, 126 that may receive the broadcast are cellular telephones.

An alert message initiator 108 may generate and provide an EAS alert message at 86 to an emergency alert network 110. The alert message initiator 108 may be, for example, a first responder to a scene (e.g., fire fighter, police officer, emergency medical technician, etc.), the local government, an agency (e.g., National Weather Service), an emergency manager of an entity (e.g., designated person in the emergency center of a hospital or campus), an automated system (e.g., a fire alarm, electronic sensors that detect toxic gas), an Emergency Operations Center (EOC), an on-site Incident Commander, public utility, or the like. For example, there may be an origination point at the federal level for national warnings, and a designated emergency manager may have the authorization to request that an emergency alert be broadcast. Counties and local governments may have their own emergency management organization to serve counties and local tribunals, with an emergency manager at the county or local level that has the authorization to initiate a request for transmission of an emergency alert. Campuses may have a point of contact to support emergency management for a university that are authorized to request transmission of emergency alerts. Depending on the level, different levels of authorization may be granted. The emergency manager may be limited to requesting emergency alert transmission to a select area.

The EAS alert message may contain information about the emergency event, such as location, severity, type, etc. The alert message may include general alert types such as general weather alerts, general natural disaster alerts, general government alerts, or the like, and/or specific alert types such as a child abduction (e.g., AMBER), geophysical (e.g., landslide), meteorological (e.g., windstorms, tornados, hurricanes, tsunamis, lighting storms, thunderstorms, freezing rain, blizzards, fog), general emergency and public safety, law enforcement, military, homeland and local/private security, rescue and recovery, fire suppression and rescue, medical and public health, pollution and other environmental conditions, public and private transportation, utility, telecommunication, other non-transport infrastructure, CBRNE (Chemical, Biological, Radiological, Nuclear or Explosive) threat or attack and/or system test, or the like. The alert message may also include alert security levels such as warnings, watches, advisories, or the like that may be associated with each alert type, for example.

EAS alert messages are provided, at 88, via the emergency alert network 110, to the emergency alert server 112. The emergency alert server 112 may be part of an Emergency Operations Center 111. An operator 113, emergency alert server 112, or other entity capable of handling the alert message may handle the alert message at the Emergency Operations Center 111. For example, upon receipt of the alert message, the emergency alert server 112 may validate the credentials of the alert message source. The operator 113, for example, may determine the severity of the emergency and determine whether the corresponding emergency alert, such as an EAS alert, should be broadcast, and if so, to what areas.

The relevant geographic area affected by the emergency event may be determined in a number of ways, such as by the emergency alert initiator 108, the emergency alert network 110, or in the Emergency Operations Center 111, for example. The geographic area could be described in terms of a landmark, a latitude/longitude, a selected location on a device that transmits the alert message, or the like. The affected geographic area may be a specified distance from a specific location provided in the alert message. For example, where there has been a chemical spill, the affected geographical area may be a specified range from a specific location. The alert message initiator 108, such as the first responder, could provide the range in the alert message to the emergency alert network 110 at 86, and base the geographic area on a range around a spill location that it is unsafe for humans. Alternately, the emergency alert network 110 or the Emergency Operations Center 111 may analyze the type of emergency and the location and provide the alert message with a specified affected geographical area.

The alert messages maybe provided by the emergency alert server 112 to the broadcast server 114, at 90. The broadcast server 114 can then provide all of the alert messages to the wireless broadcast network 116 at 92. The wireless broadcast network 116 can be any type of communication network including the example networks described below in FIGS. 4-6, for example. Additionally, the wireless broadcast network 116 can be operated by a network provider. For example, an organization, corporation, association, or the like, for example, a mobile communications provider such as Verizon Corporation, Sprint Corporation, AT&T Corporation, T-Mobile Corporation, and the like, can broadcast emergency alerts to a geographic region covered by applicable cellular communication towers of the cellular radio network. The mobile devices that receive the alert may be those that are subscribers to the communications service provider. However, the mobile devices that receive the alert may be any of those in range of the broadcasted emergency alerts that are capable of wireless reception. Users may opt in or out of receiving emergency alerts, or they may select the types of emergency alerts they would like to receive.

In an example embodiment, the geo-target mapping module 118 may be incorporated into the telecommunications server. The geo-target mapping module 118 may be incorporated into the Emergency Operations Center 111, the broadcast server 114, or the wireless broadcast network 116, for example. Alternately, the geo-target mapping module 118 may be maintained separately from these entities. Any of 111, 112, 114, 116 may access the geo-target mapping module 118 to determine which components of the telecommunications system, such as specific cell towers, can be used to broadcast alert messages. For example, the emergency alert server 112 may provide a request to the geo-target mapping module 118 for the cell IDs (cell sites) associated with an identified geographic area. As described in more detail below, the geo-target mapping module 118 may identify the set of cell sites in the affected geographic area that support wireless emergency alerts and which have broadcast technologies.

The geo-target mapping module 118 may determine the broadcast capability of each cell site in accordance with any appropriate means, such as requesting the broadcast capability of each cell site from an appropriate processor. For example, the base station controller shown in FIGS. 4 and 5 may maintain information about the cell sites by data routed from the base transceiver stations. The geo-targeting mapping module 118 may query the cell site, access a database, request, or otherwise determine the information about each cell site and use it to determine cell site broadcast capabilities for an affected geographic region. In another example, the information for each cell site is obtained from a wireless operator who owns each cell site.

At 92, the broadcast server 114 can provide the alert messages to the wireless broadcast network 116. The network 116 may include any type of communication network such as the internet, a Local Area Network (LAN), a Wide Area Network (WAN), a cellular telephone, or the like. For example, the network 116 may include the example networks described below in FIGS. 4-6 such as GSM, UMTS, CDMA, WiFi, WiMax, EDGE, or the like. The network 116 may be operated by a network provider such as an internet service provider, a cellular telephone provider, or the like. According to an example embodiment, the network provider may offer bandwidth and/or network access to subscribers thereof to enable communication between the subscribers and other devices such as cellular phones, PDAs, PCs, Voice over Internet Protocol devices, analog telephone devices, or the like. The mobile devices that receive the alert may be those that are subscribers to the communications service provider. The emergency alerts may also be formatted to be received by any mobile device that is capable of wireless reception.

The broadcast server 114 may instruct the wireless broadcast network to transmit the emergency alerts. The instructions may include the cell sites to broadcast from based on the cell site information obtained from the geo-target mapping module 118. At 94, the wireless broadcast network 116 can broadcast the alert messages to a geographic area using the cell sites identified by the geo-target mapping module 118. The wireless broadcast network 116 may then broadcast the emergency alerts in a range that covers the affected geographic area. In this example, at 94, the cell sites broadcast via a cellular network an emergency alert to mobile devices, such as 122 and 124, that are in the covered geographic area. Any telecommunications component that transforms, transmits, or processes information in connection with a broadcast, or otherwise facilitates the broadcast of information, may broadcast such information. The network provider can offer bandwidth and/or network access to its subscribers to enable communication between subscribers and other users of electronic devices and/or mobile devices such as cellular phones, PDAs, PCs, Voice over Internet Protocol devices, analog telephone devices, or the like.

Each of the emergency alert server 112, the broadcast server 114, the mobile device 124, the broadcast processor 119, and the EAS processor 120 can comprise any appropriate type of processor. Example processors can be implemented in a single processor or multiple processors. Multiple processors can be distributed or centrally located. Multiple processors can communicate wirelessly, via hard wire, or a combination thereof. Examples processors include mobile communications devices, mobile telephones, personal digital assistants (PDAs), lap top computers, handheld processors, or a combination thereof. The EAS processor 120 and the broadcast processor 119 can be implemented as a single processor, separate processors, distributed processors, or a combination thereof. The emergency alert server 112 and the broadcast server 114 can be implemented as a single processor, separate processors, distributed processors, or a combination thereof.

Mobile devices 122 and 124 may be representative of any appropriate type of device that may be utilized to receive an alert message and/or render and output the alert message in a suitable format to the subscriber. For example, in one embodiment, the device 122 may be any type of receiver or transceiver device with broadcast reception capabilities (e.g., cell phone, pager, FDA, PC, modem, router, gateway, specialized broadcast receiving device, first responder Mobile Data Terminal (MDT), FM/AM radio, NOAA weather radio, Land Mobile Radio (LMR), satellite radio receiver, satellite phone and television).

According to other example embodiments, devices 122 or 124 may also be any appropriate mobile device, such as, for example, a portable device, a variety of computing devices including (a) a portable media player, e.g., a portable music player, such as an MP3 player, a walkman, etc., (b) a portable computing device, such as a laptop, a personal digital assistant ("PDA"), a portable phone, such as a cell phone of the like, a smart phone, a Session Initiated Protocol (SIP) phone, a video phone, a portable email device, a thin client, a portable gaining device, etc., (c) consumer electronic devices, such as TVs, DVD players, set top boxes, monitors, displays, etc., (d) a public computing device, such as a kiosk, an in-store musical sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

The mobile devices that are within range from the broadcasting cell sites may receive the emergency alert. The mobile devices that receive the alert may only be those of users that subscribe to a particular wireless service. However, the alerts may be formatted such that mobile devices may receive the alert regardless of their service provider. Mobile device users 123 and 125 may then be warned via the emergency alert via their mobile devices, 122 and 124.

Figure 2:
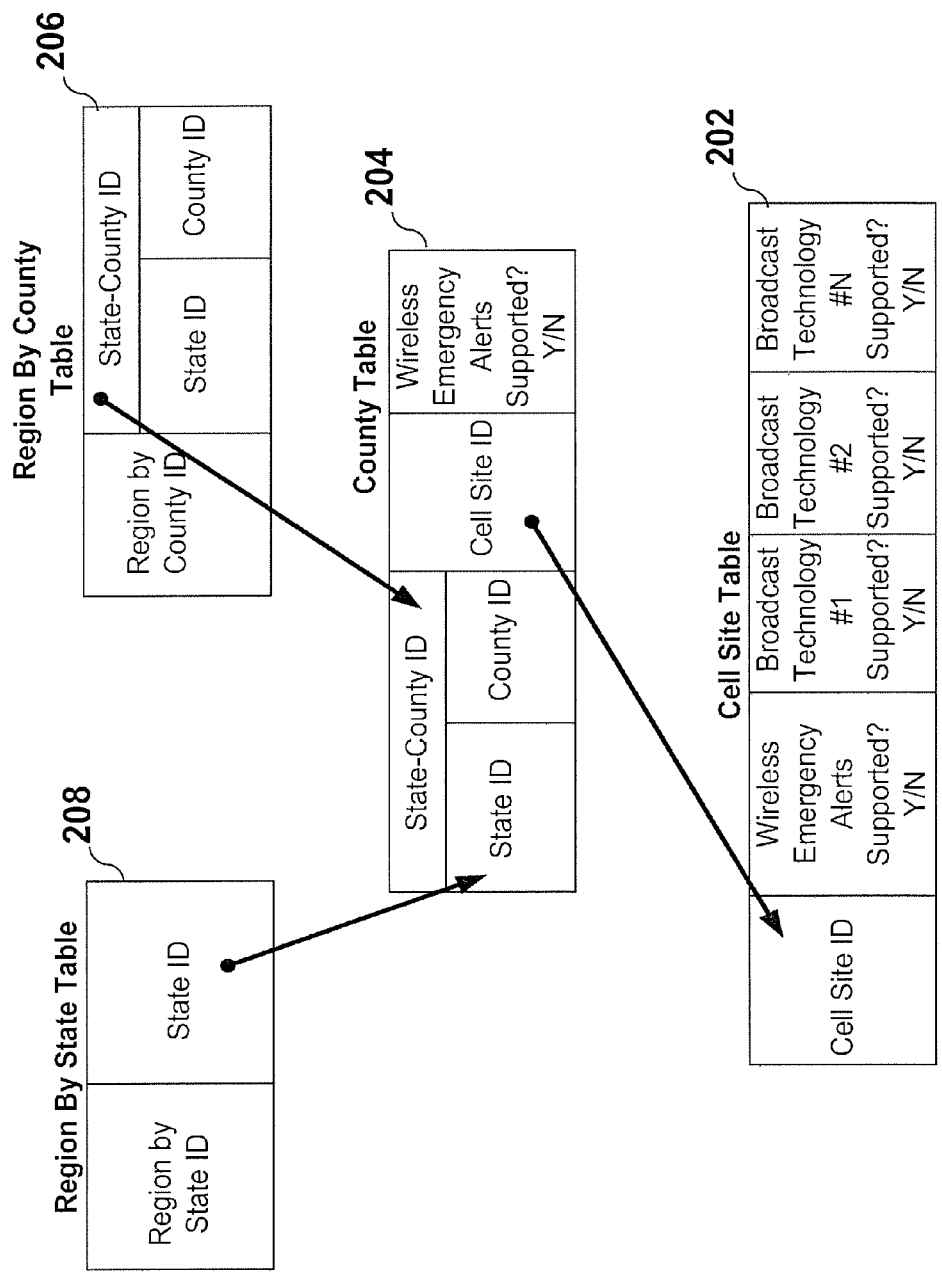
FIG. 2 depicts a geo-target mapping methodology across various geographic areas (i.e., cell site, county, state, region).

FIG. 2 is an example of the mapping of a geo-targeting mapping module 118 used to determine the cell sites that support broadcast technology for different geographic areas. The geographic areas may be defined in various ways. For example, the geographic area could be a city block, a college campus, a shopping center, a nuclear power plant, a privately-owned building or property, a government building or property, a zip code, a township, a county, a state, a region, a nation, or a location and a range from that location, etc. The geographic area affected by an emergency event may be provided to the geo-target mapping module 118, such as by the emergency alert initiator 108 or the emergency alert server 112, for example. The geo-target mapping module 118 may identify the cell site or cell sites that are capable of broadcasting emergency alert messages to the affected geographic area, The geo-target mapping module 118 may maintain, store, or access cell site information and identify the cell sites based on the corresponding geographical areas for which they belong.

FIG. 2 provides an example of geo-targeting that starts with the cell site level. The geographic areas (i.e., based on the cell site level, the county level, the state level, the region level, etc.), are each represented by a table (i.e., Cell Site Table 202, County Table 204, Region by County Table 206, and Region by State Table 208. However, the geographic area may be reduced to a more granular geographic area, such as a college campus, or a more broad area, such as a country. Thus, the geo-target mapping module 118 may geo-target various geographic areas based on various geographic areas, and map the relationship of those geographic areas.

The cell sites in each geographic area maybe identified in Table 202 at the cell site level by a Cell Site ID. The table entry associated to the Cell Site identity (ID) may include an indication of whether or not the cell site has RF coverage, if the cell site supports wireless emergency alerts, if the cell site has broadcast capabilities for wireless emergency alerts, and any specific broadcasting technologies that the cell site supports.

Geo-targeting may be accomplished at the cell site level to build the set of cell sites for each broadcast technology. As shown in FIG. 2, Cell Site Table 202 may identify the cell sites and their associated capabilities related to the support of wireless emergency alerts. The Cell Site Table includes a Cell Site ID that uniquely identifies the cell site. The Cell Site ID may be a numeric value, an alphabetic value, or an alphanumeric value and may be created by the wireless operator who owns the cell site. The Cell Site Table may indicate whether or not wireless emergency alerts are supported by this particular cell site (corresponding to the Cell Site ID) and what broadcast technologies could be available at the cell site. For example, Broadcast Technology #1 could be Cell Broadcast Service (CBS) and Broadcast Technology #2 could be MBMS. The tables could include any candidate broadcast technology (e.g., MediaFLO, DVB-H, etc.). For each broadcast technology that is supported by the particular cell site, the Cell Site ID may be included in a list of cell sites for that technology.

The County Table 204 identifies the cell sites which provide RF coverage within a county, and provides a link between the specified county and the county's state. Table entries for any specific county may include both the cell sites located within the county and the cell sites which are located outside of the county, but have RF coverage within at least a part of the county. The relationship between the County Table and the Cell Site Table may be maintained via the Cell Site ID.

Geo-targeting may be accomplished at the county level to build the set of cell sites for each broadcast technology that correspond to the county. The County Table 204 demonstrates a table for access to information about the cell sites in the county that support broadcast technology. The County ID may identify a county within a state. The County ID could be a county name, the county abbreviation, or the numeric country code value defined in the Federal Information Processing Standard 6-4 (FIPS 6-4), for example. The County ID is generally only unique on a state level.

The "Wireless Emergency Alerts Supported" attribute for the County Table 204 may be maintained to improve the efficiency of the return information from the geo-target mapping module 118. For example, if wireless emergency alerts are not supported within a specific county, this attribute could be set to "N" and there would be no reason to extract and evaluate entries from the Cell Site Table. For each broadcast technology that is supported by the particular cell site, the Cell Site ID may be included in a list of cell sites for that technology for that county.

An example scenario that may benefit from geo-targeting an emergency alert at the county level is if a tornado is traveling towards or through a region, and a particular geographic area covered by the county is at risk. The county emergency manager, or other designated emergency alert initiator 108, may want to alert the individuals in the county as soon as possible to provide the opportunity for the individuals to retreat to safety. Because so many people carry mobile devices, broadcasting an emergency alert that may be received by mobile devices may be the most efficient and immediate way to reach the most people in the county. To determine if the county has any broadcasting capabilities, the emergency alert system, such as that shown in FIG. 1, may request information from the geo-target mapping module 118.

The geo-target mapping module 118 may access the information from the County Table 204 to determine if the county has any broadcasting capabilities. The determination can be made without having to evaluate each cell site individually. If the county does or does not have any capabilities of emergency alert broadcasts, the determination can be made quickly. The factor of time may be crucial when confronted with an emergency. If the county does have broadcast capabilities, for example, the geo-target mapping module 118 may extract the emergency alert broadcasting capabilities from the Cell Site Table 202. The emergency alert broadcasting capabilities for the cell sites relevant to the geographic area covered by the county may be easily accessible, such as through a database maintained by the geo-target mapping module 118. If the geo-target mapping module 118 determines that the county is capable of broadcasting emergency alerts, then the information may be extracted from the Cell Site Table 202. Alternately, the geo-target mapping module 118 may request information from cell sites to update the database. During times of non-emergency, the geo-target mapping module 118 may continuously update a database of various cell sites relevant to various geographic areas, and indicate the emergency alert broadcast capabilities for each cell site.

The Cell Site IDs that are identified in County Table 204 as having emergency alert broadcasting capabilities may be used to extract information for each cell site from the Cell Site Table 202. As shown in FIG. 2, the various broadcasting technologies supported by each cell site can be identified. Thus, not only can the geo-target mapping module 118 determine the specific cell sites that are available in the county for broadcasting emergency alerts, the types of broadcasting technology may be identified. The type of information in the Cell Site Table 202 could be any information that would support the determination of the broadcasting capabilities for any cell sites.

If one cell site in the county supports wireless emergency alerts, the Cell Site ID may be extracted from the Cell Site Table 202. Thus, even if an emergency alert could only be broadcast from one cell site in the county, the information can be easily obtained and returned by the geo-target mapping module 118 by the method depicted in FIG. 2. The supporting cell site may be selected for broadcasting the alert, even if the entire affected geographic area may not receive the broadcast. However, a portion of the affected geographic area within range of the supporting cell site may receive the emergency alert. Alternately, a number of cell sites may be capable of broadcasting emergency alerts to the affected geographic region, and only a select number of those cell sites may be selected for the broadcast. For example, cell sites that broadcast to overlapping geographic areas may not all be necessary for the broadcast of the emergency alert.

Geo-targeting may be accomplished at the state level to build the set of cell sites for each broadcast technology that correspond to the state. In FIG. 2, geo-targeting at the state level is accomplished via the County Table 204, although other mapping methodologies are contemplated. One or more counties may be identified and maintained that correspond to a state. For example, the County Table 204 depicts a table for access to information about the cell sites in each county, corresponding to the County ID, for each state, corresponding to a State ID. There may be multiple table County ID table entries that correspond to the same State 1D. Each Cell Site 1D may be extracted for each County ID that supports wireless emergency alerts, and each County ID for a particular State ID may be identified to geo-target all of the cell sites for a particular state. The State ID may identify the state or other associated area (e.g., District of Columbia). The State ID could be the state name, the state abbreviation, or the numeric state code value defined in the Federal Information Processing Standard 5-2 (FIPS 5-2), for example. The State-County ID uniquely identifies any specific county in the nation and may be composed of the concatenation of the State ID and the County ID.

The "Wireless Emergency Alerts Supported" attribute for the County Table 204 may be maintained to improve the efficiency of the return information from the geo-target mapping module 118. For example, if wireless emergency alerts are not supported within a specific county, this attribute could be set to "N" and there would be no reason to extract and evaluate entries from the Cell Site Table. For each broadcast technology that is supported by the particular cell site, the Cell Site ID may be included in a list of cell sites for that technology for that county for each state.

The technique for geo-targeting based on geographic areas in FIG. 2 include geo-targeting at the Region by County level to build the set of cell sites for each broadcast technology that correspond to the region. The Regions by County Table 206 may be maintained with an identification of which counties in which states are contained within the area indicated by the Region by County ID. The Region by County ID identifies the region that is defined on a county basis (e.g., the National Capital Region of the nation's capital includes the District of Columbia, selected counties of Virginia, and selected counties of Maryland). The relationship between the Region by County Table and the County Table is via the State-County ID. If a County ID in the Region by County Table 206 is identified in the County Table 204 as supporting wireless emergency alerts, then the cell site information may be extracted from the Cell Site Table based on the Cell Site ID from the County Table 204.

The technique for geo-targeting based on geographic areas in FIG. 2 include geo-targeting at the Region by State level to build the set of cell sites for each broadcast technology that correspond to the state. The Region by State ID identifies the region that is defined on a state basis. For example, a FEMA region may be defined by a set of states (e.g., FEMA Region 3 is the District of Columbia, Delaware, Maryland, Pennsylvania, Virginia, and West Virginia). The Regions by State Table 208 may be maintained with an identification of which states are contained within the region, as indicated by the Region by State ID. For example, FEMA regions could be defined via this table. The relationship between the Region by State Table and the County Table is via the State ID.

Figure 3:
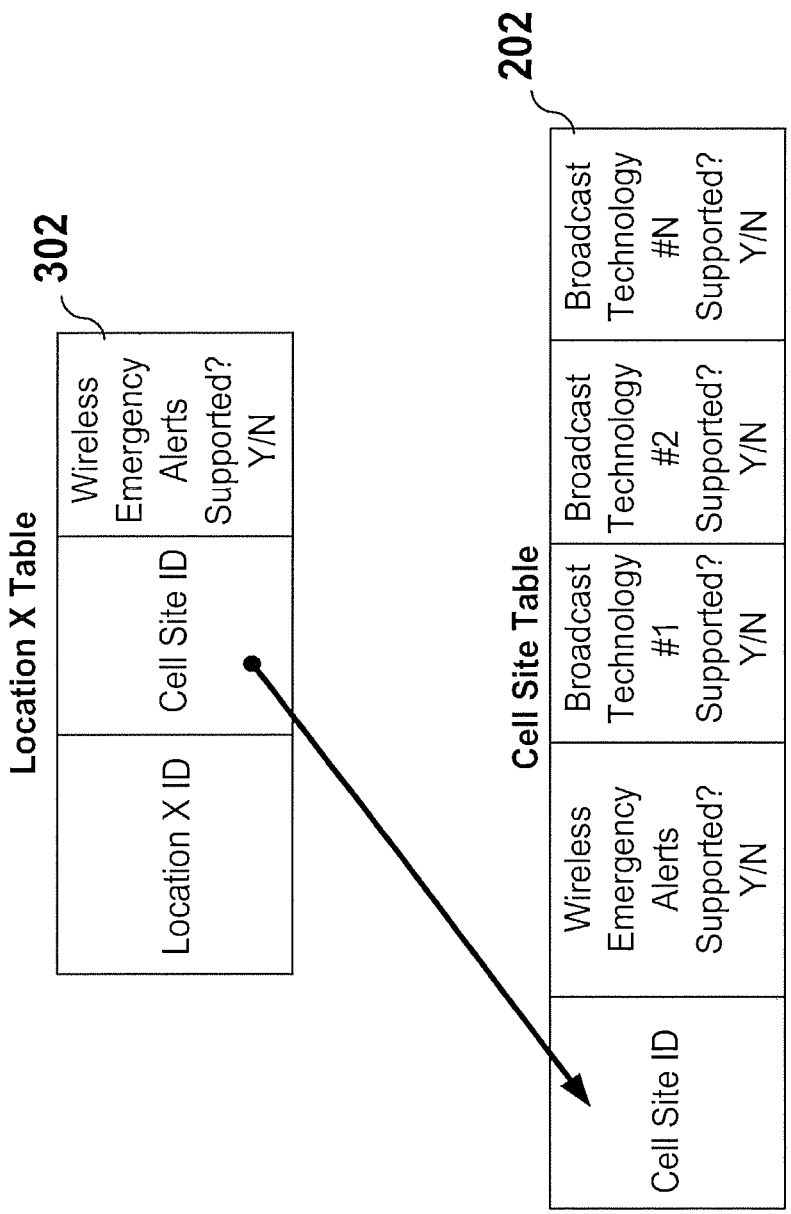
FIG. 3 depicts a geo-target mapping methodology for a specified location (i.e., Location X)

FIG. 2 depicts the geo-target mapping information in relational tables. However, any method may be used to collect this information, such as one massive flat table, a series of tables as shown, a combined table for each geographical grouping, or a relational database such as an SQL based database. FIG. 2 depicts the mapping methodology for an example subset of geographic areas (i.e., the cell site level, the county level, the state level, the region level, etc.), each represented by a table (i.e., Cell Site Table 202, County Table 204, Region by County Table 206, and Region by State Table 208). By geo-targeting at the cell site level to build the set of cell sites for each broadcast technology, geo-targeting may be accomplished for any location based on a similar schema as shown in FIG. 2. The geographic areas could be designated for geographic areas that are both smaller and larger than the examples shown in FIG. 2. FIG. 3 depicts the geo-targeting of a geographic area, where the geographic area is designated as Location X. Location X could be any area defined as any geographical area, such as a nuclear power plant location, the boundaries of a college campus, a city block or blocks, an area surrounding a body of water, or any other select area.

Geo-targeting at the location X geographic area may be accomplished at the "Location X" level to build the set of cell sites for each broadcast technology that correspond to Location X. For example, a college campus may be subject to an emergency event, such as a shooting on or around campus. The emergency alert initiator 108, from FIG. 1, could be an authorized emergency manager at a college campus. The geo-target mapping module 118 may be used to geo-target the college campus, particularly the affected geographic area that may be defined by the boundaries of the college campus.

Referencing the Location X Table 302, the Location X ID may identify the college campus and its boundaries. Similar to other locations, a Location X ID may be assigned to particular locations and be used as part of the geo-targeting technique. For example, the Location X ID for the college campus may be maintained as a code list prepared by the FCC for college campuses.

A Cell Site Table 202, also shown in FIG. 2, may identify both the cell sites within the affected geographic area defined by Location X and each cell site's associated capabilities related to the support of wireless emergency alerts. The Cell Site Table 202 includes a Cell Site ID that uniquely identifies the cell site. The Cell Site ID may be a numeric value, an alphabetic value, or an alphanumeric value and may be created by the wireless operator who owns the cell site. The Cell Site Table may indicate whether or not wireless emergency alerts are supported by this particular cell site (corresponding to the Cell Site ID) and what broadcast technologies could be available at the cell site. For example, Broadcast Technology #1 could be Cell Broadcast Service (CBS) and Broadcast Technology #2 could be MBMS. The tables could include any candidate broadcast technology (e.g., MediaFLO, DVB-H, etc.). For each broadcast technology that is supported by the particular cell site, the Cell Site ID may be included in a list of cell sites for that technology.

Table entries for the Cell Site ID in Location X Table may include the cell sites located within the identified boundaries and the cell sites which are located outside of the identified boundaries, but have RF coverage within at least a part of the affected geographic area. The "Wireless Emergency Alerts Supported" attribute for the Location X Table 204 may be maintained to improve the efficiency of the return information from the geo-target mapping module 118. For example, if wireless emergency alerts are not supported within a specific county, this attribute could be set to "N" and there would be no reason to extract and evaluate entries from the Cell Site Table. For each broadcast technology that is supported by the particular cell site, the Cell Site ID may be included in a list of cell sites for that technology for that county for each state.

Thus, if there is a request for an emergency alert to be provided to a geographic area affected by an emergency event, the cell sites that can support the broadcast of the emergency alerts may be mapped, maintained, and accessed in the manner disclosed herein. Geo-targeting for any size geographic areas such that emergency messages may be delivered to mobile and static devices of different types in a localized area provide for an emergency alert system that pinpoints an affected geographic area and provides alerts that may be received by mobile devices in the geographic area. The geo-target mapping module 118 identifies the cell sites for which broadcasting from the cell sites may cover, all or in part, a geographic area that is affected by the emergency event.

The following description sets forth some exemplary telephony radio networks and non-limiting operating environments for providing a notification of an EAS alert message using a personal area network. The below-described operating environments should be considered non-exhaustive, however, and thus the below-described network architectures merely show how the services of the notification system for alerting users of portable devices of emergencies may be incorporated into existing network structures and architectures. It can be appreciated, however, that the notification system for alerting users of portable devices of emergencies can be incorporated into existing and/or future alternative architectures for communication networks as well.

The global system for mobile communication (GSM) is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As can be appreciated, the exemplary GSM/GPRS environment and services described herein also can be extended to 3G services, such as Universal Mobile Telephone System (UNITS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), etc., as well as to other network services that become available in time. In this regard, the techniques of the geo-target mapping module 118 can be applied independently of the method of data transport, and do not depend on any particular network architecture, or underlying protocols.

Figure 4:
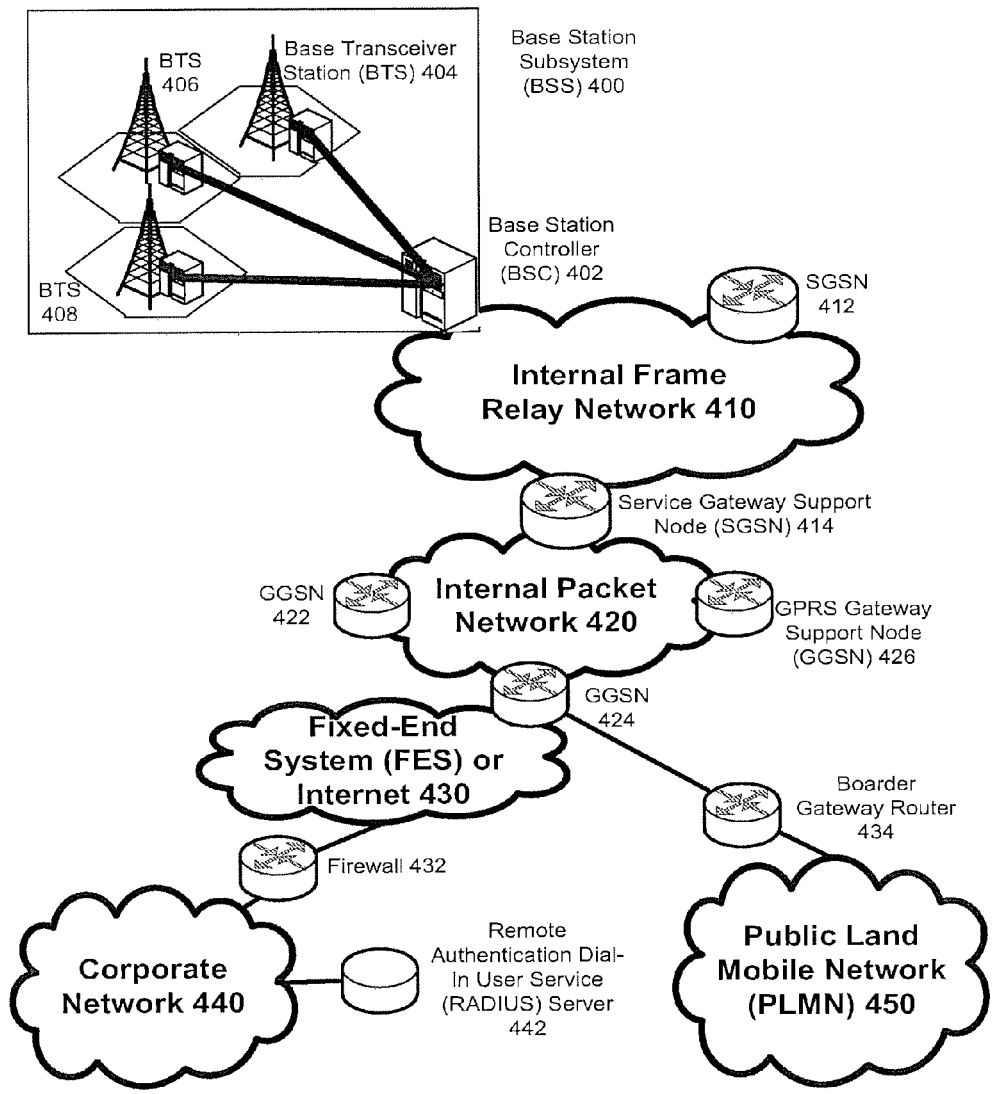
FIG. 4 depicts an overall block diagram of an exemplary packet-based mobile cellular network environment, such as a GPRS network, in which the system for providing alert messages based on a characteristic and/or configuration can be practiced.

FIG. 4 depicts an overall block diagram of an example packet-based mobile cellular network environment, such as a GPRS network, in which geo-target mapping can be practiced. In an example configuration, there are a plurality of Base Station Subsystems (BSS) 400 (only one is shown), each of which comprises a Base Station Controller (BSC) 402 serving a plurality of Base Transceiver Stations (BTS) such as BTSs 404, 406, and 408. BTSs 404, 406, 408, etc. are the access points where users of packet-based mobile devices (e.g., WCD 102) become connected to the wireless network. In exemplary fashion, the packet traffic originating from user devices (e.g., WCD 102) is transported via an over-the-air interface to a BTS 408, and from the BTS 408 to the BSC 402. Base station subsystems, such as BSS 400, are a part of internal frame relay network 410 that can include Service GPRS Support Nodes (SGSN) such as SGSN 412 and 414. Each SGSN is connected to an internal packet network 420 through which a SGSN 412, 414, etc. can route data packets to and from a plurality of gateway GPRS support nodes (GGSN) 422, 424, 426, etc. As illustrated, SGSN 414 and GGSNs 422, 424, and 426 are part of internal packet network 420. Gateway GPRS serving nodes 422, 424 and 426 mainly provide an interface to external Internet Protocol (IP) networks such as Public Land Mobile Network (PLMN) 450, corporate intranets 440, or Fixed-End System (FES) or the public Internet 430. As illustrated, subscriber corporate network 440 may be connected to GGSN 424 via firewall 432; and PLMN 450 is connected to GGSN 424 via boarder gateway router 434. The Remote Authentication Dial-In User Service (RADIUS) server 442 may be used for caller authentication when a user of a mobile cellular device calls corporate network 440.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
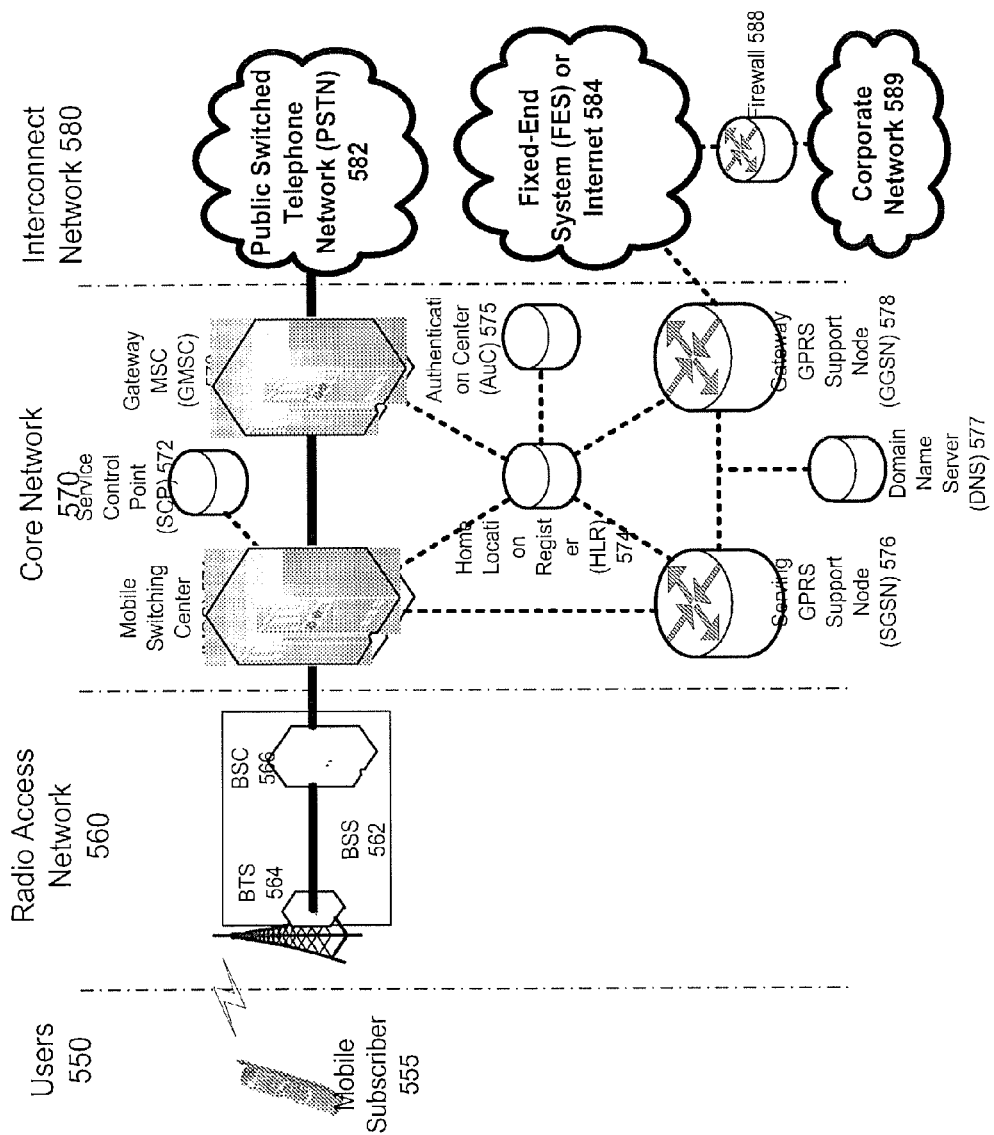
FIG. 5 illustrates an architecture of a typical GPRS network as segmented into four groups.

FIG. 5 illustrates an architecture of a typical GPRS network as segmented into four groups: users 550, radio access network 560, core network 570, and interconnect network 580. Users 550 comprise a plurality of end users (though only mobile subscriber 555 is shown in FIG. 5). In an example embodiment, the device depicted as mobile subscriber 555 comprises the WCD 102. Radio access network 560 comprises a plurality of base station subsystems such as BSSs 562, which include BTSs 564 and BSCs 566. Core network 570 comprises a host of various network elements. As illustrated in FIG. 5, core network 570 may comprise Mobile Switching Center (MSC) 571, Service Control Point (SCP) 572, gateway MSC 573, SGSN 576, Home Location Register (HLR) 574, Authentication Center (AuC) 575, Domain Name Server (DNS) 577, and GGSN 578. Interconnect network 580 also comprises a host of various networks and other network elements. As illustrated in FIG. 5, interconnect network 580 comprises Public Switched Telephone Network (PSTN) 582, Fixed-End System (FES) or Internet 584, firewall 588, and Corporate Network 589.

mobile switching center can be connected to a large number of base station controllers. At MSC 571, for instance, depending on the type of traffic, the traffic may be separated in that voice may be sent to Public Switched Telephone Network (PSTN) 582 through Gateway MSC (GMSC) 573, and/or data may be sent to SGSN 576, which then sends the data traffic to GGSN 578 for further forwarding.

When MSC 571 receives call traffic, for example, from BSC 566, it sends a query to a database hosted by SCP 572. The SCP 572 processes the request and issues a response to MSC 571 so that it may continue call processing as appropriate. 33 The HLR 574 is a centralized database for users to register to the GPRS network. HLR 574 stores static information about the subscribers such as the International Mobile Subscriber Identity (IMSI), subscribed services, and a key for authenticating the subscriber. HLR 574 also stores dynamic subscriber information such as the current location of the mobile subscriber. Associated with HLR 574 is AuC 575. AuC 575 is a database that contains the algorithms for authenticating subscribers and includes the associated keys for encryption to safeguard the user input for authentication.

In this disclosure, depending on context, the term mobile device user may be a subscriber, and either reference may sometimes refers to the end user and sometimes to the actual portable device, such as the WCD 102, used by an end user of the mobile cellular service. When a mobile subscriber turns on his or her mobile device, the mobile device goes through an attach process by which the mobile device attaches to an SGSN of the GPRS network. In FIG. 5, when mobile subscriber 555 initiates the attach process by turning on the network capabilities of the mobile device, an attach request is sent by mobile subscriber 555 to SGSN 576. The SGSN 576 queries another SGSN, to which mobile subscriber 555 was attached before, for the identity of mobile subscriber 555. Upon receiving the identity of mobile subscriber 555 from the other SGSN, SGSN 576 requests more information from mobile subscriber 555. This information is used to authenticate mobile subscriber 555 to SGSN 576 by HLR 574. Once verified, SGSN 576 sends a location update to HLR 574 indicating the change of location to a new SGSN, in this case SGSN 576. HLR 574 notifies the old SGSN, to which mobile subscriber 555 was attached before, to cancel the location process for mobile subscriber 555. HLR 574 then notifies SGSN 576 that the location update has been performed. At this time, SGSN 576 sends an Attach Accept message to mobile subscriber 555, which in turn sends an Attach Complete message to SGSN 576.

After attaching itself with the network, mobile subscriber 555 then goes through the authentication process. In the authentication process, SGSN 576 sends the authentication information to HLR 574, which sends information back to SGSN 576 based on the user profile that was part of the user's initial setup. The SGSN 576 then sends a request for authentication and ciphering to mobile subscriber 555. The mobile subscriber 555 uses an algorithm to send the user identification (ID) and password to SGSN 576. The SGSN 576 uses the same algorithm and compares the result. If a match occurs, SGSN 576 authenticates mobile subscriber 555. 36 Next, the mobile subscriber 555 establishes a user session with the destination network, corporate network 589, by going through a Packet Data Protocol (PDP) activation process.

Briefly, in the process, mobile subscriber 555 requests access to the Access Point Name (APN), for example, UPS.com (e.g., which can be corporate network 589 in FIG. 3) and SGSN 576 receives the activation request from mobile subscriber 555. SGSN 576 then initiates a Domain Name Service (DNS) query to learn which GGSN node has access to the UPS.com APN. The DNS query is sent to the DNS server within the core network 570, such as DNS 577, which is provisioned to map to one or more GGSN nodes in the core network 570. Based on the APN, the mapped GGSN 578 can access the requested corporate network 589. The SGSN 576 then sends to GGSN 578 a Create Packet Data Protocol (PDP) Context Request message that contains necessary information. The GGSN 578 sends a Create PDP Context Response message to SGSN 576, which then sends an Activate PDP Context Accept message to mobile subscriber 555.

Once activated, data packets of the call made by mobile subscriber 555 can then go through radio access network 560, core network 570, and interconnect network 580, in a particular fixed-end system or Internet 584 and firewall 588, to reach corporate network 589.

Thus, network elements can invoke the functionality of the EAS alert reporting in accordance with geo-target mapping, but they are not limited to Gateway GPRS Support Node tables, Fixed End System router tables, firewall systems, VPN tunnels, and any number of other network elements as required by the particular digital network.

Figure 6:
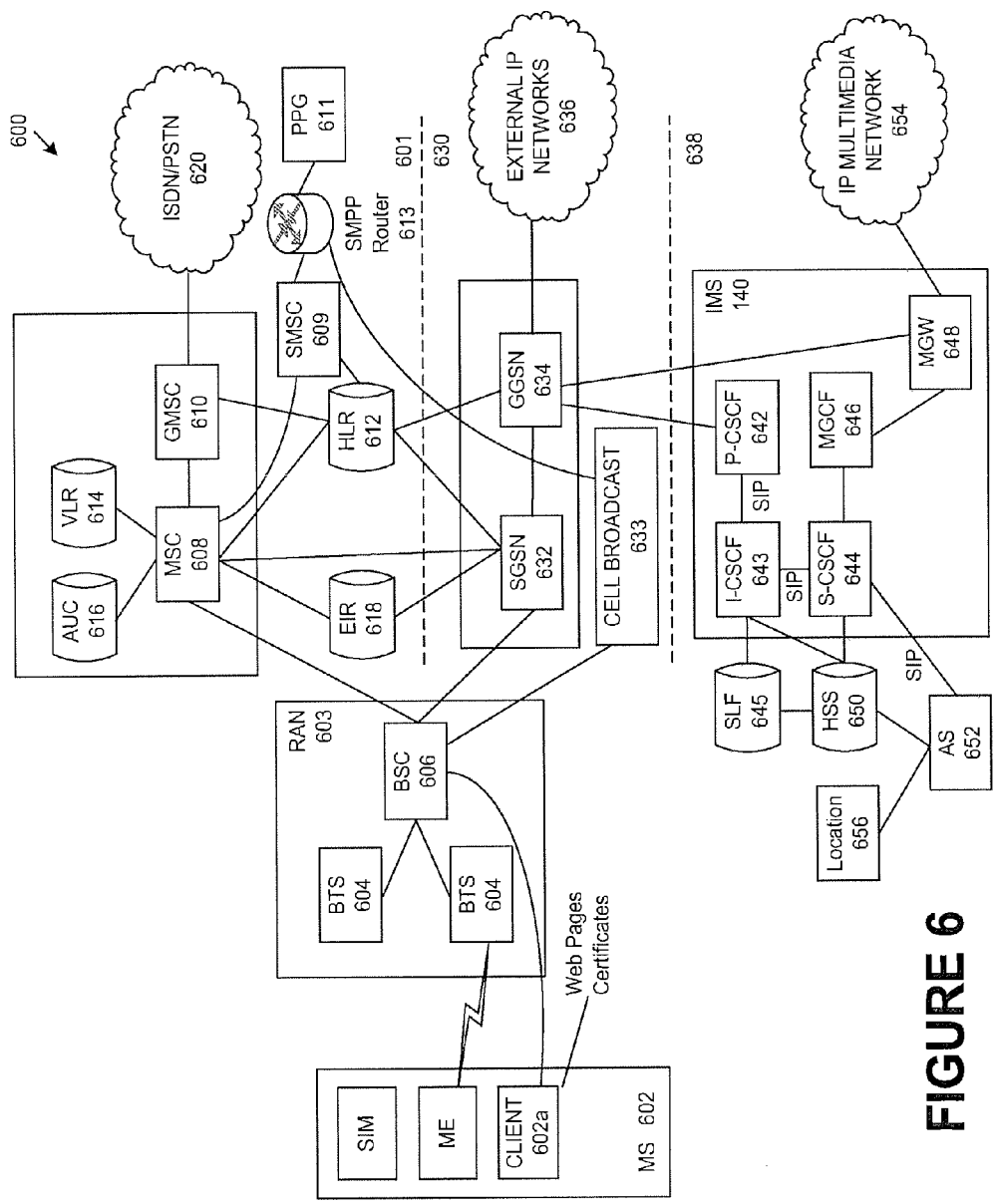
FIG. 6 illustrates an example alternate block diagram of an exemplary GSM/GPRS/IP multimedia network architecture in which alert messages based on a characteristic and/or configuration can be incorporated.

FIG. 6 illustrates another exemplary block diagram view of a GSM/GPRS/iP multimedia network architecture 600 in which geo-target mapping may be incorporated. As illustrated, architecture 600 of FIG. 6 includes a GSM core network 601, a GPRS network 630 and an IP multimedia network 638. The GSM core network 601 includes a Mobile Station (MS) 602, at least one Base Transceiver Station (BTS) 604 and a Base Station Controller (BSC) 606. The MS 602 is physical equipment or Mobile Equipment (ME), such as a mobile phone or a laptop computer (e.g., portable device 20) that is used by mobile subscribers, with a Subscriber identity Module (SIM). The SIM includes an International Mobile Subscriber Identity (IMSI), which is a unique identifier of a subscriber. The BTS 604 is physical equipment, such as a radio tower, that enables a radio interface to communicate with the MS. Each BTS may serve more than one MS. The BSC 606 manages radio resources, including the BTS. The BSC may be connected to several BTSs. The BSC and BTS components, in combination, are generally referred to as a base station (BSS) or radio access network (RAN) 403.

The GSM core network 601 also includes a Mobile Switching Center (MSC) 608, a Gateway Mobile Switching Center (GMSC) 610, a Home Location Register (HLR) 612, Visitor Location Register (VLR) 614, an Authentication Center (AuC) 618, and an Equipment Identity Register (EIR) 616. The MSC 608 performs a switching function for the network. The MSC also performs other functions, such as registration, authentication, location updating, handovers, and call routing. The GMSC 610 provides a gateway between the GSM network and other networks, such as an Integrated Services Digital Network (ISDN) or Public Switched Telephone Networks (PSTNs) 620. Thus, the GMSC 610 provides interworking functionality with external networks.

The HLR 612 is a database that contains administrative information regarding each subscriber registered in a corresponding GSM network. The HLR 612 also contains the current location of each MS. The VLR 614 is a database that contains selected administrative information from the HLR 612. The VLR contains information necessary for call control and provision of subscribed services for each MS currently located in a geographical area controlled by the VLR. The HLR 612 and the VLR 614, together with the MSC 608, provide the call routing and roaming capabilities of GSM. The AuC 616 provides the parameters needed for authentication and encryption functions. Such parameters allow verification of a subscriber's identity. The EIR 618 stores security-sensitive information about the mobile equipment.

A Short Message Service Center (SMSC) 609 allows one-to-one Short Message Service (SMS) messages to be sent to/from the MS 602. A Push Proxy Gateway (PPG) 611 is used to "push" (i.e., send without a synchronous request) content to the MS 602. The PPG 611 acts as a proxy between wired and wireless networks to facilitate pushing of data to the MS 602. A Short Message Peer to Peer (SMPP) protocol router 613 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulls messages.

To gain access to GSM services, such as speech, data, and short message service (SMS), the MS first registers with the network to indicate its current location by performing a location update and IMSI attach procedure. The MS 602 sends a location update including its current location information to the MSC/VLR, via the BTS 604 and the BSC 606. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 630 is logically implemented on the GSM core network architecture by introducing two packet-switching network nodes, a serving GPRS support node (SGSN) 632, a cell broadcast and a Gateway GPRS support node (GGSN) 634. The SGSN 632 is at the same hierarchical level as the MSC 608 in the GSM network. The SGSN controls the connection between the GPRS network and the MS 602. The SGSN also keeps track of individual MS's locations and security functions and access controls.

A Cell Broadcast Center (CBC) 633 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 634 provides a gateway between the GPRS network and a public packet network (PDN) or other IP networks 636. That is, the GGSN provides interworking functionality with external networks, and sets up a logical link to the MS through the SGSN. When packet-switched data leaves the GPRS network, it is transferred to an external TCP-IP network 636, such as an X.25 network or the Internet. In order to access GPRS services, the MS first attaches itself to the GPRS network, by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel In a NOM3 network, a MS can monitor pages for a circuit switched network while received data and vice versa.

The IP multimedia network 638 was introduced with 3GPP Release 5, and includes an IP multimedia subsystem (IMS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) 644. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSS's 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656 (e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice). The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of a notification system for alerting users of wireless communication devices of emergencies using a personal area network compatible accessory have been described in connection with various computing devices, the underlying concepts can be applied to any computing device or system capable of providing a notification for alerting users of portable devices of emergencies. The various techniques described herein can be implemented in connection with hardware or software or, where appropriate, with a combination of both. Thus, the methods and apparatus for a notification system for alerting users of portable devices of emergencies, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for providing a notification for alerting users of portable devices of emergencies. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for a notification system for alerting users of wireless communication devices of emergencies using a personal area network compatible accessory also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for a notification system for alerting users of wireless communication devices of emergencies using a personal area network compatible accessory. When implemented on a general-purpose processor, the program code combines with the processor to provide a unique apparatus that operates to invoke the functionality of a notification system for alerting users of wireless communication devices of emergencies using a personal area network compatible accessory. Additionally, any storage techniques used in connection with a notification system for alerting users of wireless communication devices of emergencies using a personal area network compatible accessory can invariably be a combination of hardware and software.

While a notification system for alerting users of wireless communication devices of emergencies using a personal area network compatible accessory has been described in connection with the various embodiments of the various figures, it is to be understood that other similar embodiments can be used or modifications and additions can be made to the described embodiment for performing the same function of the notification system for alerting users of wireless communication devices of emergencies using a personal area network compatible accessory without deviating therefrom. For example, one skilled in the art will recognize that the notification system for alerting users of wireless communication devices of emergencies using a personal area network compatible accessory as described in the present application may apply to any environment, whether wired or wireless, and may be applied to any number of such devices connected via a communications network and interacting across the network. Therefore, the notification system for alerting users of wireless communication devices of emergencies using a personal area network compatible accessory should not be limited to any single embodiment, but rather should be construed in breadth and scope in accordance with the appended claims.

While geo-target mapping as disclosed herein can be used determine the broadcasting capabilities of a cell site or telecommunications system, it is to be understood that other similar embodiments can be used or modifications and additions can be made to the described embodiment for performing the same functions described herein. For example, one skilled in the art will recognize that a system of geo-target mapping via another relational method can be used determine broadcasting capabilities, and may apply to any environment, whether wired or wireless, and may be applied to any number of devices connected via a communications network and interacting across the network.

What is claimed:

1. A computer-readable storage medium that is not a propagating signal, the computer-readable storage medium comprising executable instructions that when executed by a process cause the process to effectuate operations comprising:
    receiving an indication of an affected geographic area;
    identifying at least one cell site relevant to the affected geographic area;
    determining broadcast alert capabilities of each of the at least one identified cell site;
    providing an indication of the determined capabilities of the at least one identified cell site; and
    mapping a relationship between the affected geographic area and at least one secondary geographic area that is at least partially within the affected geographic area, wherein:
        the capabilities for the at least one identified cell site in the affected geographic area are determined based on capabilities of at least one cell site in the at least one secondary geographic area; and
        a same base station serves the affected geographic area and the at least one secondary geographic area.

2. The computer-readable storage medium of claim 1, wherein providing the indication of the capabilities for the at least one identified cell site comprises providing an indication of a broadcast technology supported by the at least one identified cell site.

3. The computer-readable storage medium of claim 1, the operations further comprising storing an identity of each of the at least one identified cell site relevant to the affected geographic area and the indication of the capabilities for each of the cell sites.

4. The computer-readable storage medium of claim 1, the operations further comprising providing a message to a broadcast network with the capabilities of the at least one identified cell site relevant to the affected geographic area.

5. The computer-readable storage medium of claim 1, the operations further comprising broadcasting an alert to the affected geographic area from at least one of the at least one identified cell site having respective broadcast capabilities.

6. An apparatus comprising:
    a processor; and
    memory coupled to the processor, the memory comprising executable instructions that when executed by the processor cause the processor to effectuate operations comprising:
        determining broadcast capabilities of a cell site, wherein broadcast capabilities of a cell site comprise a capability of a cell site to handle alerts;
        compiling indications of the broadcast capabilities of the cell site, wherein the cell site is associated with a cell site identity (ID); and
        mapping the cell site identity (ID) to a first geographic area, wherein:
            the first geographic area is a subset of a second geographic area;
            the second geographic area is mapped to the first geographic area such that the cell site identity (ID) is associated with the first geographic area and the second geographic areas; and
            a same base station serves the first geographic area and the second geographic area.

7. The apparatus of claim 6, the operations further comprising mapping the broadcast capabilities to the geographic area.

8. The apparatus of claim 6, the operations further comprising:

receiving an indication of an event; and if the event affects the geographic area mapped to the cell site identity (ID), providing the cell site identity (ID).

9. The apparatus of claim 6, the operations further comprising:

providing the indication of broadcast technology supported by the cell site.

10. The apparatus of claim 6, the operations further comprising:

providing the cell site identity (ID) to a broadcasting network.

11. The apparatus of claim 6, the operations further comprising:

providing the cell site identity (ID) associated with the second geographic area to a broadcasting network for broadcasting an alert within the second geographic area.

12. The apparatus of claim 6, the operations further comprising:

compiling an indication of a broadcast technology supported by the cell site and associating the broadcast technology to the cell site identity (ID).

13. The apparatus of claim 6, wherein the geographic area comprises at least one of a city block, a college campus, a shopping center, a nuclear power plant, a privately-owned building or property, a government building or property, a zip code, a township, a county, a state, a region, a nation, or a location and a range from that location.

14. A computer-readable storage medium that is not a propagating signal, the computer-readable storage medium comprising executable instructions that when executed by a process cause the process to effectuate operations comprising:

determining broadcast capabilities of a cell site, wherein broadcast capabilities of a cell site comprise a capability of a cell site to handle alerts;

compiling indications of the broadcast capabilities of the cell site, wherein the cell site is associated with a cell site identity (ID); and mapping the cell site identity (ID) to a first geographic area, wherein:

the first geographic area is a subset of a second geographic area;

the second geographic area is mapped to the first geographic area such that the cell site identity (ID) is associated with the first geographic area and the second geographic areas; and a same base station serves the first geographic area and the second geographic area.

15. The computer-readable storage medium of claim 14, the operations further comprising mapping the broadcast capabilities to the geographic area.

16. The computer-readable storage medium of claim 14, the operations further comprising:

receiving an indication of an event; and if the event affects the geographic area mapped to the cell site identity (ID), providing the cell site identity (ID).

17. The computer-readable storage medium of claim 14, the operations further comprising:

providing the indication of broadcast technology supported by the cell site.

18. The computer-readable storage medium of claim 14, the operations further comprising:

providing the cell site identity (ID) to a broadcasting network.

19. The computer-readable storage medium of claim 14, the operations further comprising:

providing the cell site identity (ID) associated with the second geographic area to a broadcasting network for broadcasting an alert within the second geographic area.

20. The computer-readable storage medium of claim 14, the operations further comprising:

compiling an indication of a broadcast technology supported by the cell site and associating the broadcast technology to the cell site identity (ID).

\* \* \* \* \*